(12) United States Patent
Chang

(10) Patent No.: US 8,436,919 B2
(45) Date of Patent: May 7, 2013

(54) PHOTOGRAPHING METHOD OF GENERATING IMAGE OF TRACED MOVING PATH AND PHOTOGRAPHING APPARATUS USING THE PHOTOGRAPHING METHOD

(75) Inventor: Il-kwon Chang, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 311 days.

(21) Appl. No.: 12/868,267

(22) Filed: Aug. 25, 2010

(65) Prior Publication Data

US 2011/0157427 A1    Jun. 30, 2011

(30) Foreign Application Priority Data

Dec. 24, 2009    (KR) .......................... 10-2009-0130855

(51) Int. Cl.
*H04N 5/262*    (2006.01)

(52) U.S. Cl.
USPC .......................................................... 348/239

(58) Field of Classification Search ............. 348/208.14, 348/218.1, 222.1
See application file for complete search history.

(56) References Cited

U.S. PATENT DOCUMENTS

| 6,552,744 | B2* | 4/2003 | Chen .......................... 348/218.1 |
| 8,015,242 | B2* | 9/2011 | Ohi et al. ...................... 348/345 |
| 2001/0026684 | A1* | 10/2001 | Sorek et al. .................. 396/322 |
| 2004/0189849 | A1* | 9/2004 | Hofer ....................... 348/333.03 |
| 2005/0206743 | A1* | 9/2005 | Sim et al. ................... 348/218.1 |
| 2008/0177646 | A1* | 7/2008 | Frink ........................... 340/5.53 |

* cited by examiner

*Primary Examiner* — Gevell Selby
(74) *Attorney, Agent, or Firm* — Sughrue Mion, PLLC

(57) ABSTRACT

A photographing method of generating an image of a traced moving path and a photographing apparatus using the photographing method are provided. The photographing apparatus includes an image processing unit which captures a plurality of still images regarding an object, obtains state information about a state of the photographing apparatus at time points corresponding to the plurality of still images, respectively, and synthesizes the plurality of still images into an image based on the state information.

18 Claims, 6 Drawing Sheets

PHOTOGRAPHING METHOD OF GENERATING IMAGE OF TRACED MOVING PATH AND PHOTOGRAPHING APPARATUS USING THE PHOTOGRAPHING METHOD

CROSS-REFERENCE TO RELATED PATENT APPLICATION

This application claims priority from Korean Patent Application No. 10-2009-0130855, filed on Dec. 24, 2009, the disclosure of which is incorporated herein in its entirety by reference.

BACKGROUND

1. Field

Methods and apparatuses consistent with the present invention relate to a photographing method of generating an image of a traced moving path and a photographing apparatus using the photographing method, and more particularly, to a photographing method of generating an image of a traced moving path in a photographing apparatus having an auto tracing function mounted thereon, and the photographing apparatus using the photographing method.

2. Description of the Related Art

Security or surveillance is becoming more and more important. In line with this, development has been witnessed in security/surveillance techniques, the most widely used one of which being an unmanned surveillance system.

A core part of the unmanned surveillance system is a surveillance camera, which may be a fixed camera or a mechanical camera. A fixed camera is installed to photograph an object at a specific magnification in a particular direction, such that only an object within an angle of view can be surveilled, thus leading to spatial restrictions of having to install cameras in several places for a wide range of security.

A mechanical camera has been developed to compensate for the shortcomings of a fixed camera, which is commonly called a pan/tilt/zoom (PTZ) camera. The PTZ camera can rotate up, down, left and/or right, and thus, can surveil a wider spatial area than is able by a fixed camera. In addition, an object located at a long range or a close range can be a surveillance target by using a zoom lens.

SUMMARY

To control the PTZ camera, a controller for controlling up/down/left/right and zooming is used for an observer to continuously watch a captured image. To reduce the labor required and problems that may be caused by manual surveillance, an auto tracing technique may be provided to automatically trace a target and to surveil movement of the tracing target if the tracing target is detected on the screen.

In the PTZ camera having the auto tracing technique mounted thereon, the tracing technique recognizes movement of a tracing target on the screen, and a user may be able to observe detail movements of the tracing target by playing a stored moving image from the beginning to recognize the moving path of the tracing target.

One or more of exemplary embodiments provides a photographing method of generating an image of a traced moving path in a photographing apparatus having an auto tracing technique mounted thereon, and a photographing apparatus using the photographing method.

One or more exemplary embodiments also provides a photographing method of generating an image of a traced moving path, which allowing a user to intuitively recognize a moving path of a tracing target without playing a recorded image, and a photographing apparatus using the photographing method.

According to an exemplary embodiment, there is provided a photographing method using a photographing apparatus, the photographing method including generating a plurality of still images regarding an object, obtaining state information about a state of the photographing apparatus at time points corresponding to the plurality of still images, respectively, and synthesizing the plurality of still images into an image based on the state information.

The generating may include generating the plurality of still images by capturing the plurality of still images regarding the object at least one of a predetermined time interval, a predetermined space interval, a predetermined time, and a time when the object reaches a predetermined space.

The synthesized image may include a moving path of the object.

The photographing method may further include generating a moving image regarding the object, and the generating the plurality of still images may include capturing the plurality of still images regarding the object from the moving image regarding the object.

The state information may include at least one of pan angle information, tilt angle information and zoom ratio information about the photographing apparatus.

The photographing method may further include generating and storing a moving image regarding the object, wherein the moving image includes the plurality of still images, and the synthesized image is configured as an index for the moving image.

The synthesizing may include converting an arbitrary point of a first still image among the plurality of still images into a point for a coordinate system of a second still image among the plurality of still images, wherein the first still image and the second still image are synthesized by overlapping the arbitrary point of the first still image and the point to which the arbitrary point has been converted for the coordinate system of the second still image.

The converting may include converting the arbitrary point in the first still image to the point for the coordinate system of the second still image by applying to the arbitrary point at least one of a pan angle variation, a tilt angle variation, and a zoom ratio variation between the first still image and the second still image based on state information about a state of the photographing apparatus at the time of capturing the first still image and state information about a state of the photographing apparatus at the time of capturing the second still image.

The synthesized image may be a panorama image.

According to another exemplary embodiment, there is provided a photographing apparatus including an image processing unit which captures a plurality of still images regarding an object, obtains state information about a state of the photographing apparatus at time points corresponding to the plurality of still images, respectively, and synthesizes the plurality of still images into an image based on the state information.

The image processing unit may generate the plurality of still images by capturing the plurality of still images regarding the object at least one of a predetermined time interval, a predetermined space interval, a predetermined time, and a time when the object reaches a predetermined space.

The synthesized image may include a moving path of the object.

The image processing unit may generate a moving image regarding the object, and capture the plurality of still images regarding the object from the moving image regarding the object.

The state information may include at least one of pan angle information, tilt angle information and zoom ratio information about the photographing apparatus.

The image processing unit may generate a moving image regarding the object and store the moving image at a storing unit, wherein the synthesized image is configured as an index for the moving image.

The image processing unit may convert an arbitrary point of a first still image among the plurality of still images into a point for a coordinate system of a second still image among the plurality of still images, and synthesize the first still image and the second still image by overlapping the arbitrary point of the first still image and the point to which the arbitrary point has been converted for the coordinate system of the second still image.

The image processing unit may calculate the point for the coordinate system of the second still image by applying to the arbitrary point at least one of a pan angle variation, a tilt angle variation, and a zoom ratio variation between the first still image and the second still image based on state information about a state of the photographing apparatus at the time of capturing the first still image and state information about a state of the photographing apparatus at the time of capturing the second still image.

The synthesized image may be a panorama image.

The synthesized image may include time information about points-in-time at which the plurality of still images are captured, respectively.

The photographing apparatus may be a pan/tilt/zoom (PTZ) camera.

According to the exemplary embodiments, a user can intuitively recognize a moving path of a tracing target without playing a recorded image.

BRIEF DESCRIPTION OF THE DRAWINGS

The above and other aspects of the present inventive concept will become more apparent by describing in detail exemplary embodiments thereof with reference to the attached drawings, in which.

DETAILED DESCRIPTION EXEMPLARY EMBODIMENTS

Hereinafter, exemplary embodiments will be described in detail with reference to the accompanying drawings.

Figure 1:
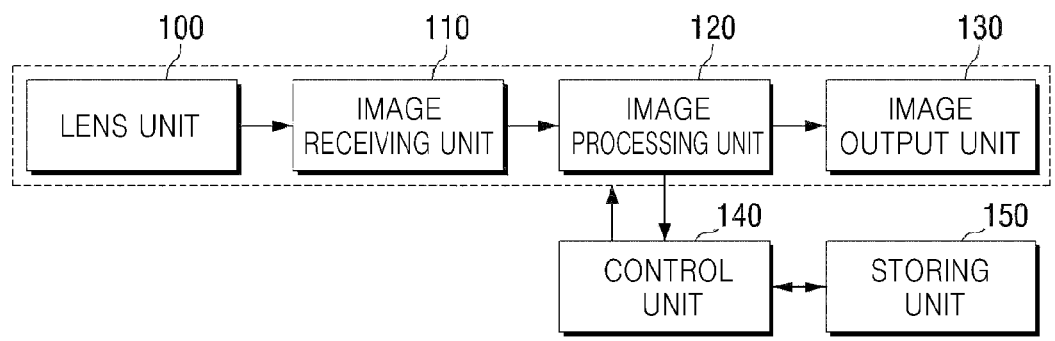
FIG. 1 is a block diagram of a pan/tilt/zoom (PTZ) camera according to an exemplary embodiment.

FIG. 1 is a block diagram of a pan/tilt/zoom (PTZ) camera according to an exemplary embodiment. The PTZ camera is a surveillance camera capable of rotating up/down/left/right, and may surveil a wider spatial area than is able by a conventional fixed camera. As shown in FIG. 1, the PTZ camera according to an exemplary embodiment includes a lens unit 100, an image receiving unit 110, an image processing unit 120, an image output unit 130, a control unit 140, and a storing unit 150.

The lens unit 100 receives an image of an object, and provides the image to the image receiving unit 110. In the PTZ camera, the lens unit 100 has a zooming function to enable photographing at a long range and close range.

The image receiving unit 110 receives the image of the object from the lens unit 100. The image receiving unit 110 may include an image sensor such as a complementary metal oxide semiconductor (CMOS) image sensor or a charge-coupled diode (CCD). That is, the image receiving unit 110 receives an optical signal from the lens unit 100, converts the optical signal into an electric signal, and provides the electric signal to the image processing unit 120.

The image processing unit 120 converts the electric signal of the image generated by the image receiving unit 110 into an image signal in a format that can be output by the image output unit 130, and provides the image signal to the image output unit 130. The image signal may also be stored in the storing unit 150.

The image processing unit 120 may capture a plurality of still images regarding the object at a predetermined time interval during movement of the object, and obtain state information about a state of the PTZ camera (referred to as "camera state information") when each of the plurality of still images is captured. The camera state information may include pan angle information, tilt angle information and zoom ratio information, and may also include time information about a time when each of the plurality of still images is captured. Thereafter, by using the plurality of captured still images and the camera state information, the plurality of still images are combined such that a moving path of the object is synthesized into an image that may be expressed as a panorama. Such a synthesizing method will be described later in detail. Here, the plurality of still images and the corresponding camera state information may be captured and obtained, respectively, while a moving image regarding the object is being processed by the image processing unit 120. In this case, the plurality of still images may be captured from the moving image. Alternatively, the image processing unit 120 may process only a plurality of still images which are received from the lens unit 100 through the image receiving unit 110, and obtain the corresponding camera state information.

The image output unit 130 displays the image signal provided from the image processing unit 120 to allow the user to see an image corresponding to the image signal.

The control unit 140 controls the pan angle, the tilt angle, and the zoom ratio of the PTZ camera. In other words, the control unit 140 enables the user to properly photograph an object at a long range and a close range by moving the lens unit 100 up, down, left or right, or by controlling the zoom ratio.

The control unit 140 controls the image receiving unit 110, the image processing unit 120, and the image output unit 130 to respectively receive, process, and display an image of the object, and to control initiation and termination of auto tracing with respect to the object.

The storing unit 150 stores image information received through the lens unit 100, or stores the camera state information and the still images captured to generate a traced moving path of the object as an image expressed as a panorama image.

While the storing unit 150 for storing the image information is provided in the PTZ camera in the current exemplary embodiment, the storing unit 150 may be provided via an external service or an external device connected to the PTZ camera.

Figure 2:
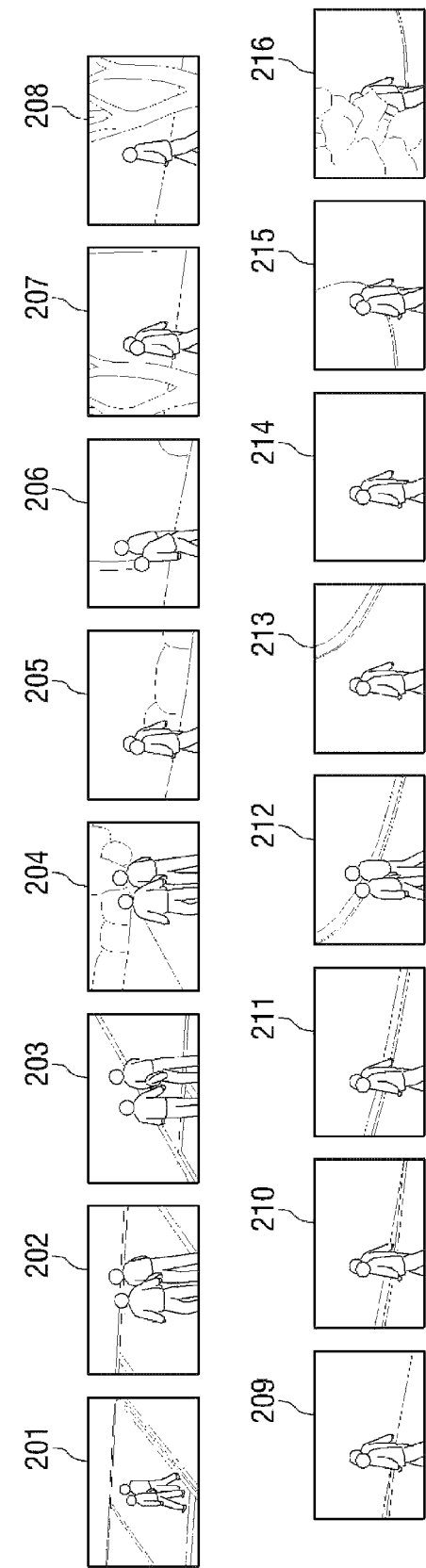
FIG. 2 illustrates a plurality of still images according to an exemplary embodiment.
Figure 3A:
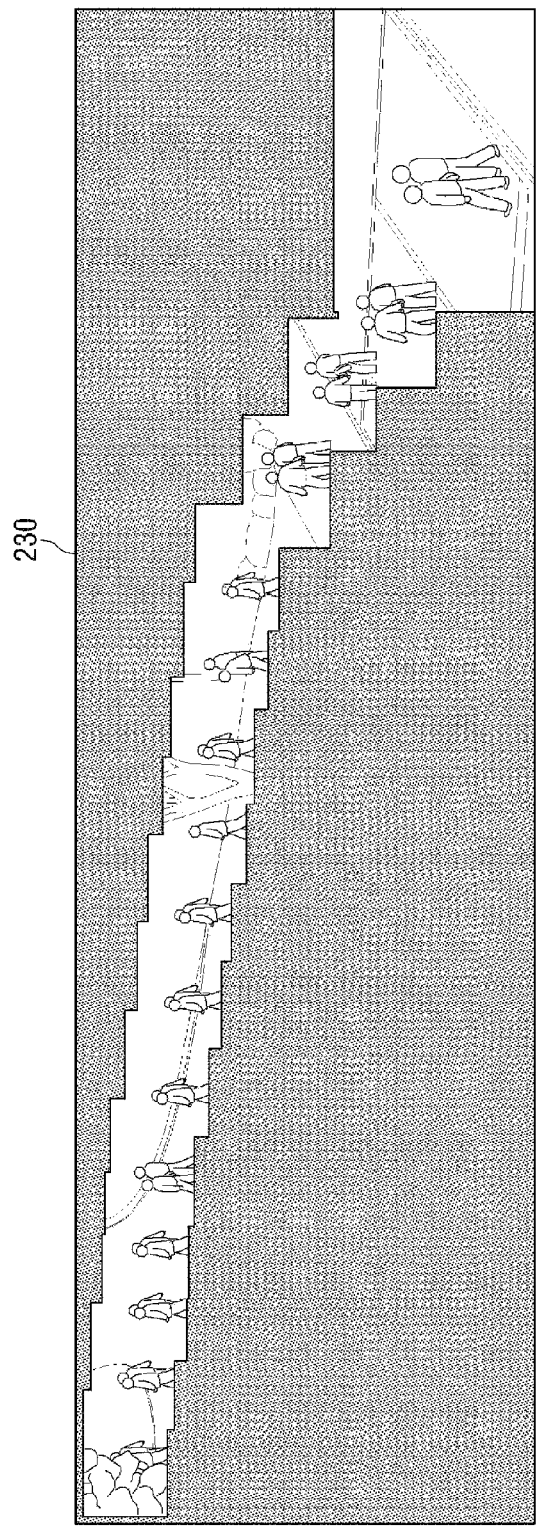
FIGS. 3A and 3B illustrate synthesized images showing a traced moving path according to an exemplary embodiment.
Figure 3B:
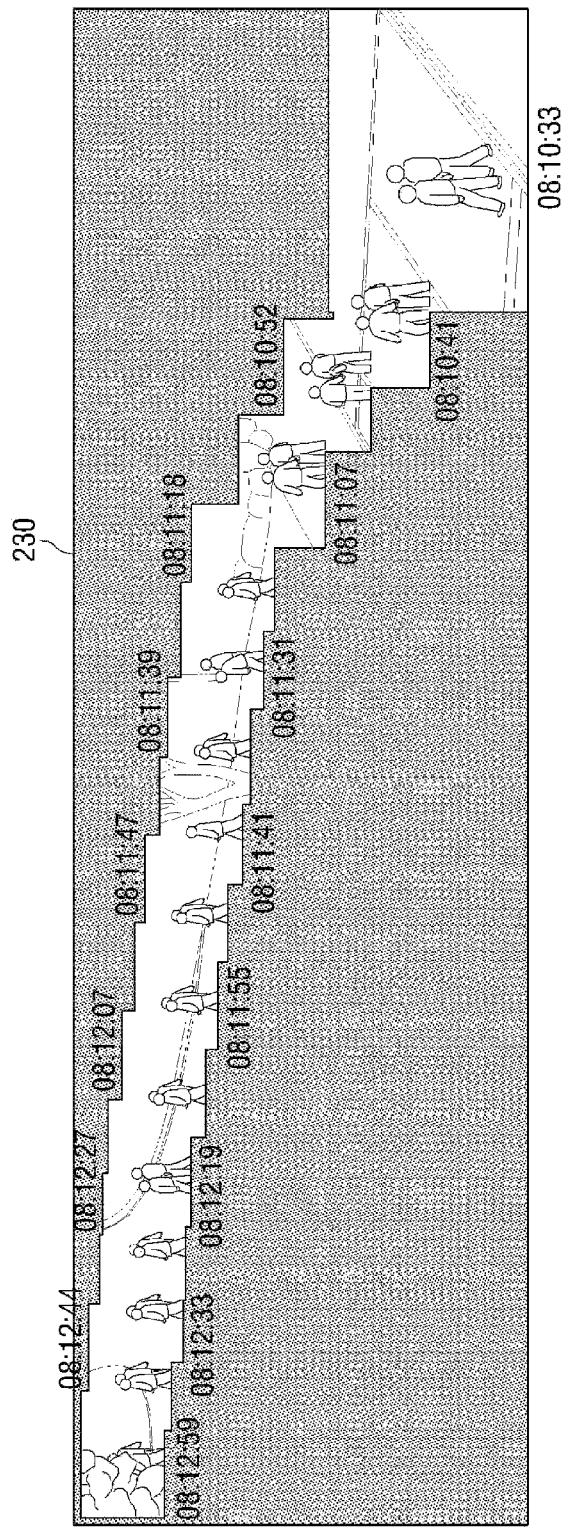
Figure 4:
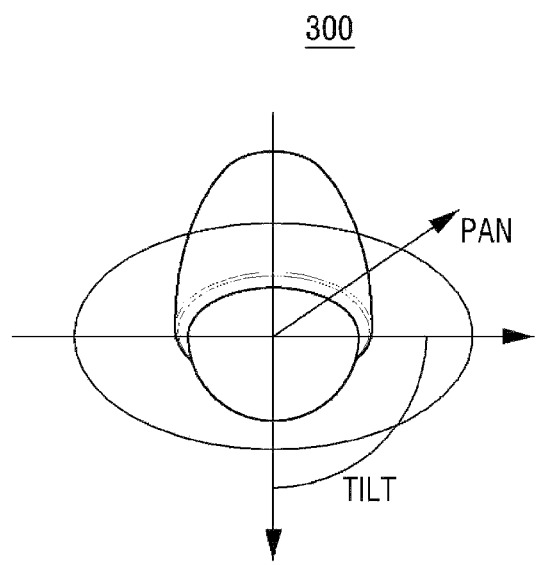
FIG. 4 illustrates a photographing apparatus according to an exemplary embodiment.

With reference to FIGS. 2 through 4, a method of generating a traced moving path of an object as a panorama image will now be described.

FIG. 2 illustrates still images of an object captured at a predetermined time interval during tracing of the object. That is, a still image 201 captured at the time of initiation of the tracing through to a still image 216 captured at the time of termination of the tracing are collected.

While the images of the object may be captured at a predetermined time interval as described above, the images of the object may also be captured at a predetermined space interval to obtain still images. Also, the images of the object may also be captured at a predetermined time or when the object reaches a predetermined place. When movement of the object over time is small, it may be desirable to capture the images of the object at a predetermined space interval. FIG. 2 illustrates still images where movement of the object is captured at a predetermined time interval during tracing the movement of the object.

The still images 201 through 216 captured from the initiation of the tracing to the termination of the tracing each include camera state information at the time of capturing. The camera state information includes pan angle information, tilt angle information, and zoom ratio information. FIG. 4 illustrates a photographing apparatus according to an exemplary embodiment. More specifically, FIG. 4 is a view for describing pan and tilt functions of a PTZ camera. As shown in FIG. 4, a PTZ camera 300 has a pan function and a tilt function (and a zoom function).

The pan function enables a user to photograph an object while following movement of the object if the object moves to the left or to the right with respect to a camera lens. The pan angle indicates an angle by which a lens rotates to the left or right from a reference point. The tilt function enables the user to photograph the object while following movement of the object if the object moves up or down with respect to a surveillance area. The tilt angle indicates an angle by which the lens moves up or down from a reference point.

The zoom function adjusts a zoom ratio, and enables the user to view an object located at long range by enlarging the object. As the ratio increases, the object may be surveilled from greater distances with respect to the camera.

That is, each of the captured still images 201 through 216 shown in FIG. 2 corresponds to camera state information at the time of capturing the still images 201 through 216. For example, the still image 201 captured at the time of initiation of tracing of movement of the object may have camera state information indicating a pan angle of 98°, a tilt angle of −40°, and a zoom ratio of ×2, and a still image 209 captured in the middle of the tracing may have camera state information indicating a pan angle of 138°, a tilt angle of −24°, and a zoom ratio of ×3.

The plurality of still images have been captured at a predetermined time interval during tracing of the object, and may provide a complete traced moving path of the object by being synthesized. FIGS. 3A and 3B illustrate panorama images generated by synthesizing the captured still images.

As shown in FIG. 3A, the 16 captured still images 201 through 216 are synthesized into a panorama image 230 from which the user can easily recognize a traced moving path of the object.

A moving image taken from the initiation of the tracing to the termination of the tracing is stored, and the generated panorama 230 may be used as an index of the stored moving image.

As shown in FIG. 3B, in the generated panorama 230, a captured point-in-time may be indicated for each of the captured still images, to provide the user with detailed information about the traced moving path of the object.

Figure 5:
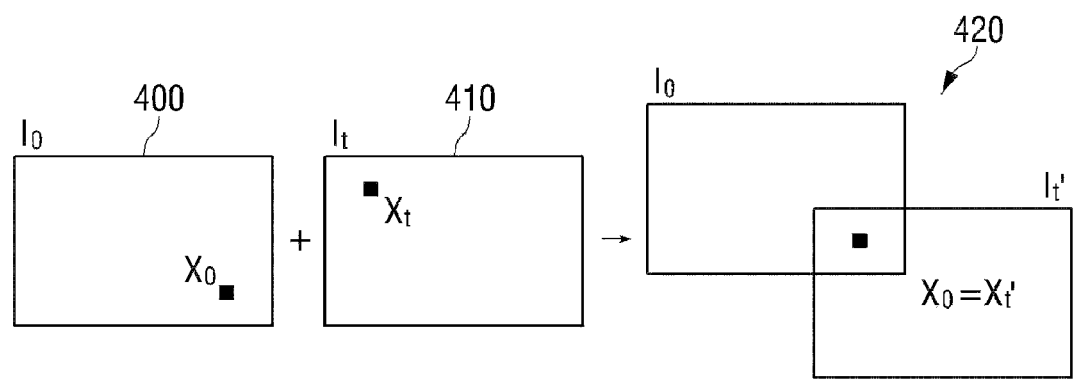
FIG. 5 is a view for describing a method of synthesizing captured still images, according to an exemplary embodiment.

Hereinafter, a method of synthesizing captured still images will be described with reference to FIG. 5.

Let a still image captured at a point-in-time '0' be $I_0$ 400, and a still image captured at a point-in-time 't' be $I_t$ 410. Let camera state information contained in the still image $I_0$ 400 be $PTZ_0 = [P_0, T_0, Z_0]$ and camera state information contained in the still image $I_t$ 410 be $PTZ_t = [P_t, T_t, Z_t]$.

An arbitrary point $X_t$ in the still image $I_t$ 410 may be converted into a corresponding point $X_0$ in the still image $I_0$ 400 by obtaining $H_{t \to 0}$. A point $X_t'$ to which the point $X_t$ is converted by $H_{t \to 0}$ for a coordinate system of the still image $I_0$ 400 may be expressed as follows:

$$\overline{X_t'} = H_{t \to 0} \overline{X_t},$$

where $$\overline{X_t} = \begin{bmatrix} X_t \\ 1 \end{bmatrix}, H_{t \to 0} = K_0 R_{0 \to t} K_t^{-1},$$

$$K_0 = \begin{bmatrix} f_0 & 0 & 0 \\ 0 & f_0 & 0 \\ 0 & 0 & 1 \end{bmatrix} (f_0 = aZ_0, a$$

is a constant, and $Z_0$ is a zoom ratio at the point-in-time '0'), and $$K_t = \begin{bmatrix} f_t & 0 & 0 \\ 0 & f_t & 0 \\ 0 & 0 & 1 \end{bmatrix}$$

($f_t = aZ_t$, a is the constant, and $Z_t$ is a zoom ratio at the point-in-time 't').

From the obtained camera state information, that is, the pan angle information and the tilt angle information, $$R_{0 \to t} = \begin{bmatrix} \cos\beta & \sin\alpha\cos\beta & \cos\alpha\sin\beta \\ 0 & \cos\alpha & -\sin\alpha \\ -\sin\beta & \sin\alpha\cos\beta & \cos\alpha\cos\beta \end{bmatrix}.$$

Herein, $\alpha = T_t - T_0$ (a tilt angle variation from the point-in-time '0' to the point-in-time 't'), and $\beta = P_t - P_0$ (a pan angle variation from the point-in-time '0' to the point-in-time 't').

Therefore, once $H_{t \to 0}$ is obtained from parameters of $PTZ_0$ and $PTZ_t$, the arbitrary point $X_t$ in the still image $I_t$ 410 is converted for the coordinate system of the still image $I_0$ 400 to find the corresponding point $X_t'$, and the still images $I_0$ 400 and $I_t$ 410 are synthesized by overlapping the points $X_t$ and $X_t'$, thus generating an image 420.

Figure 6:
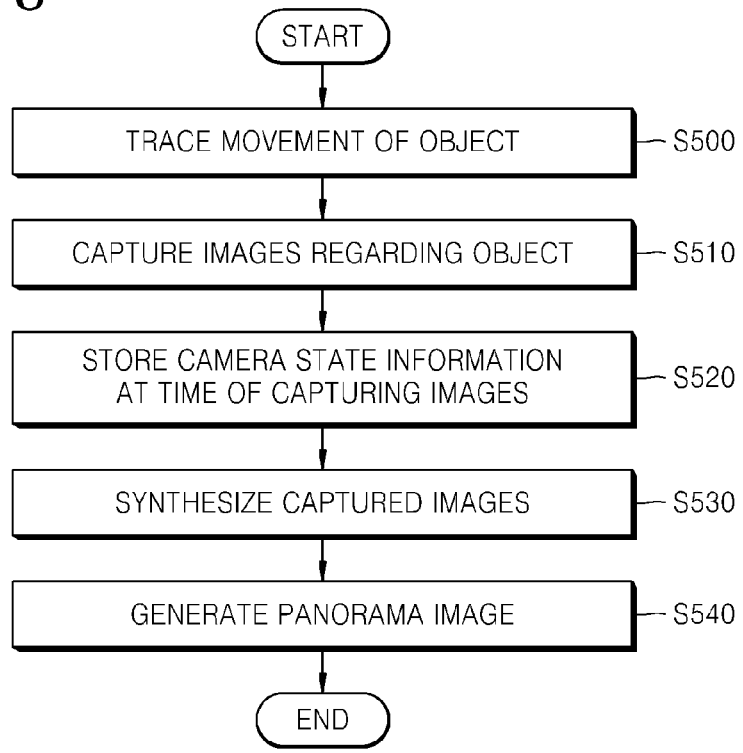
FIG. 6 is a flowchart illustrating a method of generating an image of a traced moving path according to an exemplary embodiment.

FIG. 6 is a flowchart illustrating a method of generating an image of a traced moving path according to an exemplary embodiment.

Once an object, that is, a target to be traced, is detected, tracing of the object is initiated (S500). A PTZ camera traces movement of the object while controlling a pan angle, a tilt angle and a zoom ratio according to a moving direction of the object.

Upon initiation of the tracing of the object, a plurality of still images of the object are captured at a predetermined time interval or at a predetermined space interval (S510). As discussed above, the still images of the object may also be captured at a predetermined time or when the object reaches a predetermined place. Along with capturing the still images, state information about the PTZ camera when each of the still images is captured, that is, the pan angle information, the tilt angle information and the zoom ratio information about the PTZ camera (collectively referred to as "camera state information") are stored (S520). The camera state information may also include time information about a time when each of the still images is captured.

Thereafter, based on the still images and camera state information corresponding to each of the still images, the still images are synthesized into an image by using the above-described synthesizing method (S530). The synthesized image is expressed as a panorama image (S540).

Figure 7:
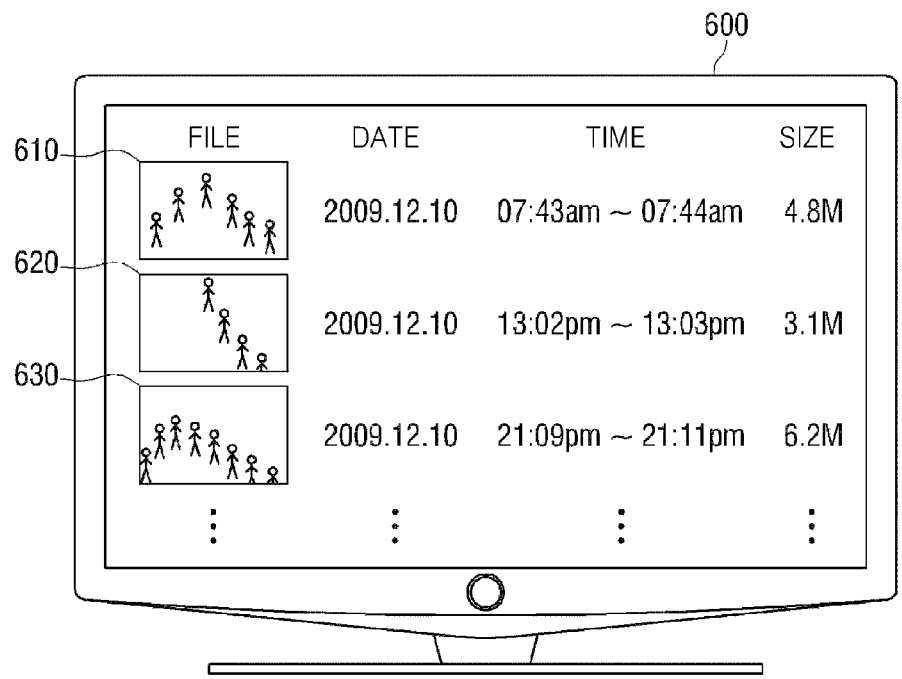
FIG. 7 illustrates an image output unit of a photographing apparatus according to an exemplary embodiment.

FIG. 7 illustrates an image output unit 600 of a photographing apparatus through which an image is displayed, according to an exemplary embodiment.

The panorama image generated as described above may be used as an index of a corresponding moving image. In FIG. 7, an image of a traced moving path of an object on Dec. 10, 2009 is displayed as an index, and each index is indicated with a tracing time and the size of a moving image corresponding to the index.

An index 610 located on the top indicates a moving image of 4.8 Mb corresponding to one (1)-minute tracing from 07:43 AM to 07:44 AM on Dec. 10, 2009. An index 620 located in the middle indicates a moving image of 3.1 Mb corresponding to one (1)-minute tracing from 13:02 PM to 13:03 PM on the same date, and an index 630 located on the bottom indicates a moving image of 6.2 Mb corresponding to one (1)-minute tracing from 21:09 PM to 21:11 PM on the same date.

However, the present inventive concept is not limited to the structure shown in FIG. 7, and may have a structure other than the structure shown in FIG. 7.

The device described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the present inventive concept, reference has been made to the exemplary embodiments illustrated in the drawings, and specific language has been used to describe these exemplary embodiments. However, no limitation of the scope of the invention is intended by this specific language, and the present inventive concept should be construed to encompass all embodiments that would normally occur to one of ordinary skill in the art.

The present inventive concept may be described in terms of functional block components and various processing steps. Such functional blocks may be realized by any number of hardware and/or software components configured to perform the specified functions. For example, the present inventive concept may employ various integrated circuit components, e.g., memory elements, processing elements, logic elements, look-up tables, and the like, which may carry out a variety of functions under the control of one or more microprocessors or other control devices. Similarly, where the elements of the present inventive concept are implemented using software programming or software elements the present inventive concept may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present inventive concept could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the present inventive concept, and are not intended to otherwise limit the scope of the present inventive concept in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the present inventive concept unless the element is specifically described as "essential" or "critical".

The use of the terms "a" and "an" and "the" and similar referents in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the present inventive concept, and does not pose a limitation on the scope of the present inventive concept unless otherwise claimed. Numerous modifications and adaptations will be readily apparent to those skilled in this art without departing from the spirit and scope of the present inventive concept.

What is claimed is:

1. A photographing method using a photographing apparatus, the photographing method comprising:
generating a plurality of still images regarding an object;
obtaining state information about a state of the photographing apparatus at time points corresponding to the plurality of still images, respectively;
synthesizing the plurality of still images into an image based on the state information; and
generating and storing a moving image regarding the object,
wherein the moving image includes the plurality of still images, and
wherein the synthesized image is configured as an index for the moving image.

2. The photographing method of claim 1, wherein the generating comprises generating the plurality of still images by capturing the plurality of still images regarding the object at at least one of a predetermined time interval, a predetermined space interval, a predetermined time, and a time when the object reaches a predetermined space.

3. The photographing method of claim 1, wherein the synthesized image comprises a moving path of the object.

4. The photographing method of claim 1,
wherein the generating the plurality of still images comprises capturing the plurality of still images regarding the object from the moving image regarding the object.

5. The photographing method of claim 1, wherein the state information comprises at least one of pan angle information, tilt angle information and zoom ratio information about the photographing apparatus.

6. The photographing method of claim 1, wherein the synthesizing comprises converting an arbitrary point of a first still image among the plurality of still images into a point for a coordinate system of a second still image among the plurality of still images, and
wherein the first still image and the second still image are synthesized by overlapping the arbitrary point of the first still image and the point to which the arbitrary point has been converted for the coordinate system of the second still image.

7. The photographing method of claim 6, wherein the converting comprises converting the arbitrary point in the first still image to the point for the coordinate system of the second still image by applying to the arbitrary point at least one of a pan angle variation, a tilt angle variation, and a zoom ratio variation between the first still image and the second still image based on state information about a state of the photographing apparatus at the time of capturing the first still image and state information about a state of the photographing apparatus at the time of capturing the second still image.

8. The photographing method of claim 1, wherein the synthesized image is a panorama image.

9. A photographing apparatus comprising:
an image processing unit which captures a plurality of still images regarding an object, obtains state information about a state of the photographing apparatus at time points corresponding to the plurality of still images, respectively, and synthesizes the plurality of still images into an image based on the state information,
wherein the image processing unit generates a moving image regarding the object and stores the moving image at a storing unit, and
wherein the synthesized image is configured as an index for the moving image.

10. The photographing apparatus of claim 9, wherein the image processing unit generates the plurality of still images by capturing the plurality of still images regarding the object at at least one of a predetermined time interval, a predetermined space interval, a predetermined time, and a time when the object reaches a predetermined space.

11. The photographing apparatus of claim 9, wherein the synthesized image comprises a moving path of the object.

12. The photographing apparatus of claim 9, wherein the image processing unit generates the moving image regarding the object, and captures the plurality of still images regarding the object from the moving image regarding the object.

13. The photographing apparatus of claim 9, wherein the state information comprises at least one of pan angle information, tilt angle information and zoom ratio information about the photographing apparatus.

14. The photographing apparatus of claim 9, wherein the image processing unit converts an arbitrary point of a first still image among the plurality of still images into a point for a coordinate system of a second still image among the plurality of still images, and synthesizes the first still image and the second still image by overlapping the arbitrary point of the first still image and the point to which the arbitrary point has been converted for the coordinate system of the second still image.

15. The photographing apparatus of claim 14, wherein the image processing unit calculates the point for the coordinate system of the second still image by applying to the arbitrary point at least one of a pan angle variation, a tilt angle variation, and a zoom ratio variation between the first still image and the second still image based on state information about a state of the photographing apparatus at the time of capturing the first still image and state information about a state of the photographing apparatus at the time of capturing the second still image.

16. The photographing apparatus of claim 9, wherein the synthesized image is a panorama image.

17. The photographing apparatus of claim 9, wherein the synthesized image comprises time information about points-in-time at which the plurality of still images are captured, respectively.

18. The photographing apparatus of claim 9, wherein the photographing apparatus is a pan/tilt/zoom (PTZ) camera.

* * * * *